(12) United States Patent
Hu

(10) Patent No.: US 11,055,209 B2
(45) Date of Patent: Jul. 6, 2021

(54) APPLICATION ANALYSIS WITH FLEXIBLE POST-PROCESSING

(71) Applicant: Google LLC, Mountain View, CA (US)

(72) Inventor: Hengxiang Hu, San Jose, CA (US)

(73) Assignee: Google LLC, Mountain View, CA (US)

( * ) Notice: Subject to any disclaimer, the term of this patent is extended or adjusted under 35 U.S.C. 154(b) by 196 days.

(21) Appl. No.: 16/109,453

(22) Filed: Aug. 22, 2018

(65) Prior Publication Data

US 2019/0196947 A1 Jun. 27, 2019

Related U.S. Application Data

(60) Provisional application No. 62/609,304, filed on Dec. 21, 2017.

(51) Int. Cl.
*G06F 11/00* (2006.01)
*G06F 11/36* (2006.01)
(Continued)

(52) U.S. Cl.
CPC ............ *G06F 11/3688* (2013.01); *G06F 8/38* (2013.01); *G06F 8/71* (2013.01); *G06F 9/451* (2018.02);
(Continued)

(58) Field of Classification Search
CPC combination set(s) only.
See application file for complete search history.

(56) References Cited

U.S. PATENT DOCUMENTS 7,379,846 B1 * 5/2008 Williams .............. G06F 11/079
702/183
7,912,705 B2 * 3/2011 Wasson ................. G06F 40/289
704/9

(Continued)

OTHER PUBLICATIONS

Automated Model Based Android GUI Testing using Multi Level GUI Comparison Criteria. Young Min Baek Doo Hwan Bae, Korea Advanced Institute of Science and Technology Daejon, Republic of Korea (Year: 2016).*

(Continued)

*Primary Examiner* — Amine Riad
(74) *Attorney, Agent, or Firm* — Colby Nipper PLLC

(57) ABSTRACT

The present disclosure describes methods and apparatuses for application analysis with flexible post-processing. One test suite can be used to analyze an application for multiple different types of potential issues. In example implementations, an application is provided to an application runner. The application runner executes the application and crawls through various user interface (UI) screens from a user interaction perspective in accordance with a test suite. Based on different UI screens, the application runner generates a set of artifacts that includes metadata pertinent to different types of potential issues with operation of the application. Multiple different post-processors are provided access to the set of artifacts, with each respective post-processor corresponding to a respective type of issue. A given post-processor processes the artifact set by traversing the metadata, extracting relevant portions thereof, and producing a report indicative of any potential problems for the type of issue corresponding to the given post-processor.

20 Claims, 10 Drawing Sheets

(51) Int. Cl.
*G06F 9/451* (2018.01)
*G06F 8/38* (2018.01)
*G06F 8/71* (2018.01)
*G06F 9/455* (2018.01)

(52) U.S. Cl.
CPC .......... *G06F 9/455* (2013.01); *G06F 11/3664* (2013.01); *G06F 11/3672* (2013.01); *G06F 11/3692* (2013.01)

(56) References Cited

U.S. PATENT DOCUMENTS

| | | | |
|---|---|---|---|
| 8,745,592 | B1 | 6/2014 | Ormandy et al. |
| 9,367,680 | B2* | 6/2016 | Mahaffey ............... G06F 21/564 |
| 9,396,237 | B1* | 7/2016 | Shah ....................... G06Q 10/10 |
| 2005/0251863 | A1* | 11/2005 | Sima ....................... G06F 21/577 726/25 |
| 2010/0088668 | A1* | 4/2010 | Yoshihama ............... G06F 8/10 717/105 |
| 2012/0110063 | A1* | 5/2012 | Prasad .................... G06Q 10/06 709/203 |
| 2012/0240236 | A1* | 9/2012 | Wyatt .................... G06F 21/564 726/25 |
| 2013/0227640 | A1* | 8/2013 | Zhou .................. H04L 63/1433 726/1 |
| 2014/0006434 | A1* | 1/2014 | Chervirala ............. G06Q 30/02 707/758 |
| 2014/0123295 | A1* | 5/2014 | Kuykendall .......... G06F 21/577 726/25 |
| 2014/0280010 | A1* | 9/2014 | Ravipati ................. G06F 16/14 707/709 |
| 2015/0095305 | A1* | 4/2015 | Tripp .................... G06F 16/958 707/709 |
| 2015/0186524 | A1* | 7/2015 | Liu .................... G06Q 30/0256 707/709 |
| 2015/0370541 | A1* | 12/2015 | Prasad ...................... G06F 8/38 717/104 |

OTHER PUBLICATIONS

"International Search Report and Written Opinion", PCT Application No. PCT/US2018/050951, dated Dec. 17, 2018, 22 pages.
Amalfitano, et al., "MobiGUITAR Automated Model-Based Testing of Mobile Apps", IEEE Software, Institute of Electrical and Electronics Engineers, US, vol. 32, No. 5, Sep. 1, 2015, Sep. 1, 2015, 7 pages.
Arlt, et al., "Lightweight Static Analysis for GUI Testing", 2012 IEEE 23rd International Symposium on Software Reliability Engineering, 2012, 10 pages.
Baek, et al., "Automated Model-Based Android GUI Testing Using Multi-Level GUI Comparison Criteria", Automated Software Engineering, ACM, 2 Penn Plaza, Suite 701 New York, NY, 10121-0701 USA, Aug. 25, 2016, Aug. 25, 2016, 22 pages.
McMaster, et al., "Developing a Feedback-Driven Automated Testing Tool for Web Applications", Quality Software (QSIC), 2012 12th International Conference, IEEE, Aug. 27, 2012, Aug. 27, 2012, 4 pages.
Schur, et al., "ProCrawl: Mining Test Models from Multi-User Web Applications", Software Testing and Analysis, ACM, 2 Penn Plaza, Suite 701 New York, NY, 10121-0701, USA, Jul. 21, 2014, Jul. 21, 2014, 4 pages.
"JMeter Tutorial", retrieved from https://mindmajix.com/jmeter-tutorial on Oct. 19, 2017, 2016, 20 pages.
"International Preliminary Report on Patentability", PCT Application No. PCT/US2018/050951, Jul. 2, 2020, 16 pages.

* cited by examiner

APPLICATION ANALYSIS WITH FLEXIBLE POST-PROCESSING

RELATED APPLICATION

This application claims priority under 35 U.S.C. § 119(e) to U.S. Provisional Patent Application 62/609,304, filed on 21 Dec. 2017, which is incorporated herein by reference in its entirety.

BACKGROUND

Electronic devices play integral roles in manufacturing, healthcare, commerce, social interaction, entertainment, and communication. For example, most people consider their smart phone to be a critical part of their daily lives. Electronic devices include personal computing devices like smart phones, notebook computers, tablet computers, smart watches and other wearable devices, game consoles, televisions, and other entertainment devices. Electronic devices also include more utilitarian items like smart speakers, safety devices with sensors to detect heat or pollutants, security devices that detect unauthorized activity, and Internet of Things (IoT) devices. Further, electronic devices with computing power are embedded in many different types of modern equipment, from medical devices to household appliances and from vehicles to industrial tools. Thus, electronic devices are manufactured in a multitude of sizes, form factors, and capabilities for an even greater array of purposes.

To enable these purposes, an executable application is created. An executable application includes code, instructions, software, and so forth that can be executed by one or more processors to provide some functionality or to realize a device feature. Historically, applications were included with the purchase of electronic devices, or customers purchased applications in a box containing a physical medium, such as a floppy disk that stored the application. Previously, with the slower pace of electronic device development and these physical approaches to delivering applications, new versions of applications were produced relatively infrequently, such as annually.

Each time a new application or a new version of an application is produced, extensive efforts are devoted to reducing the number of problems or issues that are present when the application is released. These issues are sometimes called software bugs, and the process of finding them is called software testing. Software testing is a time and resource-intensive undertaking. However, because new versions of applications were produced relatively infrequently in the past, looking for software bugs prior to an application release was likewise performed relatively infrequently. Today, however, new applications and new versions of applications are released frequently. Instead of application releases being tied to new devices, new operating system versions, or annual updates, application releases can be rolled out very frequently, such as every week.

Most device users are familiar with a virtual application market from which new applications and new versions of applications can now be obtained. For example, most smart phones, tablets, wearable devices, desktop computers, and so forth have access to a virtual application market, which is often associated with an operating system of the electronic device. Users can therefore obtain applications and application updates over a network via some virtual application market. Application developers have responded to the ease of application dissemination by providing more frequent updates to provide new features and remedy issues that are discovered by users. Fortunately, issues that are discovered by users can be fixed more quickly via the virtual application market, but these issues are still problematic. Such issues cause users frustration and inconvenience and can even render an application—or a whole electronic device—inoperable. Further, with the prevalence of social media, knowledge of application problems can spread more quickly. Thus, the existence of these problematic application issues can drive users away from one application and to a competitor's application, which results in decreased market share.

Due to these various factors, application issues cause more difficulty for application developers than ever before. Specifically, application releases occur more frequently, and the repercussions from application issues spread farther and more quickly. Unfortunately, the ability to discover application issues prior to release of an application has not kept pace with the accelerated pace of application development brought about by the existence of virtual application markets. This results in greater development costs, slower release schedules, and/or more dissatisfied users. Consequently, a better approach to the discovery or handling of application issues could support rapid improvements to, and more reliable updates for, applications that are disseminated via virtual application markets, as well as applications generally.

The description in this background section is provided to generally present the context of the disclosure. Unless otherwise indicated herein, material provided in this section is neither expressly nor impliedly admitted to be prior art to the present disclosure or the appended claims.

SUMMARY

Techniques and apparatuses are described for application analysis with flexible post-processing. These techniques and apparatuses enable one test suite to be used to analyze an application for multiple different types of potential issues. In example implementations, an application is provided to an application runner, which executes the application. Using a test suite, the application runner crawls through various user interface (UI) screens from a user interaction perspective. Based on different UI screens that are uncovered, the application runner generates a set of artifacts that includes metadata pertinent to different types of potential issues with operation of the application. These potential issues can include accessibility, UI appearance, memory usage, and so forth. The set of artifacts can be organized into a directed graph based on emulated user interactions. Multiple different post-processors are provided access to the set of artifacts, with each respective post-processor corresponding to a respective type of issue. A given post-processor processes the set of artifacts by traversing the metadata, extracting relevant portions thereof, evaluating the extracted metadata, and producing a report indicative of any potential issues for the type of issue corresponding to the given post-processor. Thus, in some scenarios, a new post-processor for a different type of issue can be applied that processes the set of artifacts without materially changing the test suite. Further, a problem-submission post-processor can review the reports provided by other post-processors to produce a problem report that highlights more pertinent issues that are identified for manual consideration.

Aspects described below include a method performed by at least one electronic device for application analysis with flexible post-processing. The method comprises loading an application to be analyzed and obtaining a test suite including multiple test cases, with each test case corresponding to at least one feature of the application. The method also comprises crawling the application from a user interaction perspective. The crawling includes activating user interaction elements based on the multiple test cases of the test suite to cause the application to produce multiple user interface (UI) screens. The crawling also includes determining multiple application states produced by the application, with each respective application state corresponding to a respective UI screen of the multiple UI screens. The method additionally comprises generating a set of artifacts based on the multiple application states. The method further comprises processing the set of artifacts to investigate multiple types of issues pertaining to operation of the application.

Aspects described below also include at least one electronic device for implementing application analysis with flexible post-processing. The electronic device comprises one or more processors and one or more computer-readable storage media storing instructions that are executable by the one or more processors. The computer-readable storage media include an application configured to offer multiple features and a test suite including multiple test cases, with each test case corresponding to at least one feature of the multiple features. The computer-readable storage media also include an application runner configured to run the application (e.g., execute or simulate execution of the application) using the test suite. The application runner includes an application crawler configured to traverse the application from a user interaction perspective and to provide metadata based on the test suite. The application runner also includes an artifact generator configured to generate a set of artifacts based on the metadata. The computer-readable storage media further include multiple post-processors configured to access the set of artifacts, with each respective post-processor configured to use the set of artifacts to investigate a respective type of issue of multiple types of issues pertaining to operation of the application.

Aspects described below additionally include at least one electronic device for implementing application analysis with flexible post-processing. The electronic device includes one or more computer-readable storage media storing processor-executable instructions that, responsive to execution by one or more processors, cause the electronic device to perform operations. The operations comprise running an application to be analyzed and emulating, based on a test suite, activation of user interaction elements to cause the application to produce multiple UI screens. The operations that are performed also comprise determining multiple application states produced by the application, with each respective application state corresponding to a respective UI screen of the multiple UI screens. The operations that are performed additionally comprise generating a set of artifacts based on the multiple application states, with the set of artifacts including a UI screen of the multiple UI screens for each application state of the multiple application states. The operations that are performed further comprise processing the set of artifacts using a first post-processor to investigate a first type of issue pertaining to operation of the application and producing, based on the processing, a first report corresponding to the first type of issue.

Aspects described below further include a system for implementing application analysis with flexible post-processing. The system comprises an application configured to offer multiple features and a test suite including multiple test cases, with each test case corresponding to at least one feature of the multiple features. The system also comprises an application runner configured to run the application using the test suite. The application runner comprises means for crawling the application from a user interaction perspective to provide metadata based on the test suite. The application runner also comprises means for generating a set of artifacts based on the metadata. The system further comprises post-processor means for processing the set of artifacts, the post-processor means configured to use the set of artifacts to investigate multiple types of issues pertaining to operation of the application.

Details of one or more implementations are set forth in the accompanying drawings and the following description. Other features and advantages will be apparent from the description and drawings, as well as from the claims. Thus, this summary section is provided to introduce subject matter that is further described in the Detailed Description and Drawings. Accordingly, the summary should not be considered to describe essential features nor be interpreted as limiting the scope of the claimed subject matter.

BRIEF DESCRIPTION OF THE DRAWINGS

Apparatuses of and techniques for implementing application analysis with flexible post-processing are described with reference to the following drawings. The same numbers are used throughout the drawings to reference like features and components.

DETAILED DESCRIPTION

Overview

Figure 1:
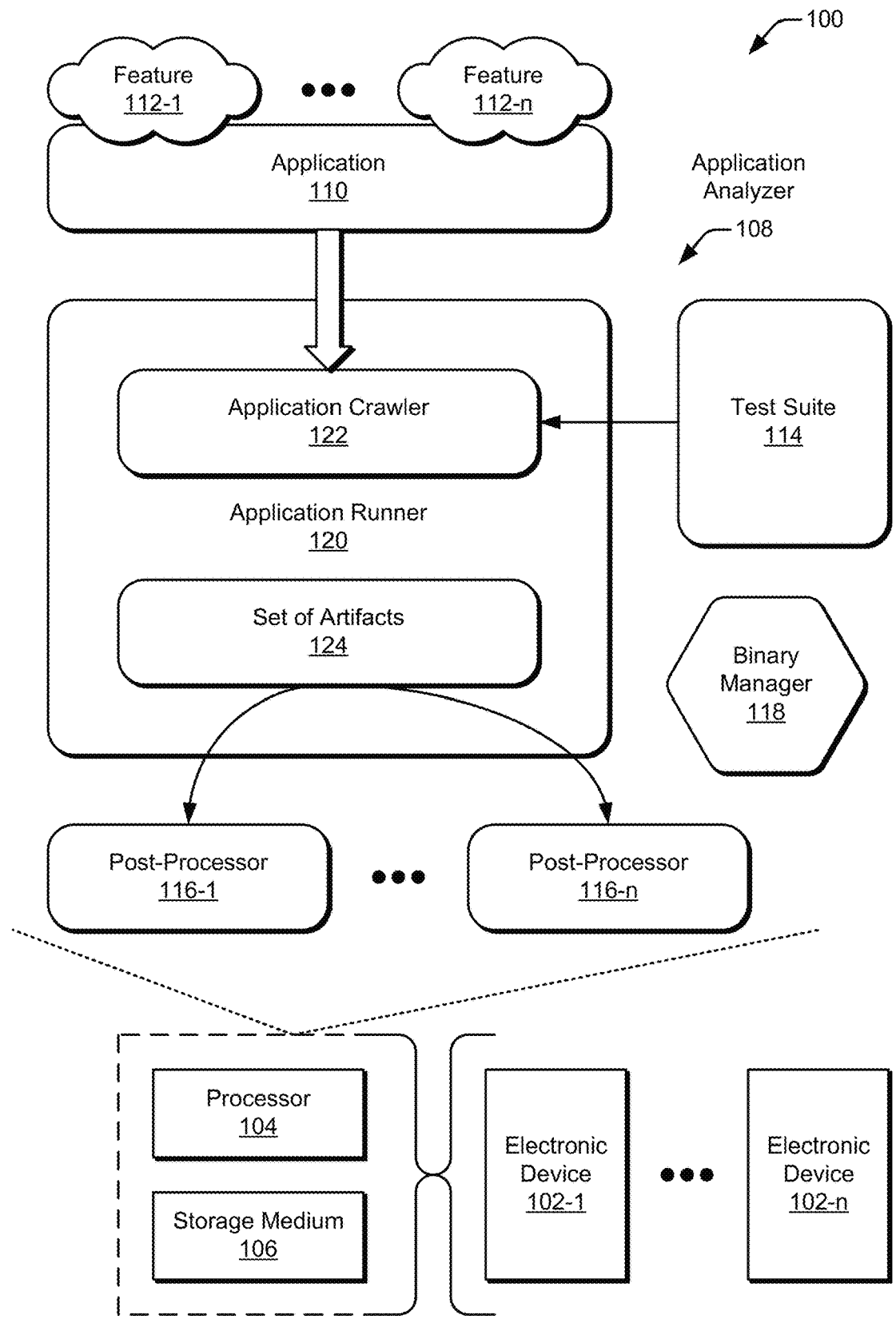
FIG. 1 illustrates an example environment, including an application analyzer having an application runner and multiple post-processors, in which application analysis with flexible post-processing can be implemented.

The creation of the internet, including high-speed broadband access to the internet, has enabled the development of virtual application markets. With a virtual application market, a user can download an application via a network quickly and easily. Applications are used to provide exciting new features and services, as well as to provide improved versions of existing services, to the customers of application developers. To keep these customers happy, developers are continually updating their applications. Further, some applications provide critical functionality—such as those associated with vehicles or those providing safety or security features. Applications providing critical functionality are updated regularly to counter any potential threats. Due to all these factors, applications are being modified and then re-released with greater frequency than in the past. With each of these releases, application developers strive to reduce the number of hidden issues that are present in a given application, as these issues—or bugs—can aggravate and alienate customers. To do so, application developers analyze each application searching for issues that can cause significant problems for many users in most situations, or those that may merely cause a single problem for a few users in rare situations.

To analyze an application for potential issues, the application may be executed responsive to a test case that is designed to look for problems in a particular area of concern, such as memory issues or user interface (UI) issues. Each test case is designed to test the application to produce metadata that pertains to the corresponding area of concern. However, modern applications, even those that run on a smart phone or a wearable device such as augmented reality (AR) glasses, are quite complex. To analyze an application with respect to just a single area of concern, a testing apparatus may employ dozens or hundreds of test cases designed to elicit metadata for that area. With multiple areas of concern, multiple sets of test cases are created, with each set of test cases corresponding to a respective area. Further, some test cases are relevant to general usage or provide a foundation for subsequently applying other test cases. With these test cases all totaled together, a suite of test cases may include thousands of interrelated test cases.

Creating these test cases is a detail-oriented and time-consuming endeavor. Hence, a test suite having hundreds, or thousands, of test cases represents a substantial investment of time, expertise, and other resources. Existing approaches to analyzing an application involve applying multiple test cases, or a homogenous test suite, to the application to produce metadata for each particular area of concern. The metadata can then be manually reviewed to determine if there are issues for the particular area. A different, specialized test suite is created for each such area of concern, and the application analysis is repeated with each specialized test suite. Thus, the resources and costs invested in creating each test suite for each potential problem area are duplicated many times. In other words, a significant portion of the efforts devoted to discovering problematic issues with an application are directed to creating each test case, which effort is often repeated across multiple areas of concern. This existing approach is therefore slow, costly, and wasteful of application-development resources.

In contrast, implementations that are described herein enable fewer test suites, including even a single test suite, to be used to analyze an application for multiple different potential problem areas. Herein, these different areas of concern are referred to as different types of issues with operation of an application. In example implementations, an application analyzer, which runs on one or more electronic devices, includes a binary manager and an application runner. The binary manager loads an application to the application runner. The application runner includes an application executor, an application crawler, an artifact generator, and a test suite interface.

The application executor executes the application. Using test cases of a test suite acquired via the test suite interface, the application crawler traverses through various user interface (UI) screens from a user interaction perspective, such as by activating user interaction elements. Based on different UI screens that are uncovered, the artifact generator generates a set of artifacts that includes metadata pertinent to the different types of issues with operation of the application. This set of artifacts may include, for example, a directed graph in which each node corresponds to a UI screen, an application state, some combination thereof, and so forth. Multiple different post-processors are provided access to the set of artifacts, with each respective post-processor corresponding to a respective type of issue. Under the control of the binary manager, a given post-processor processes the set of artifacts by traversing the metadata, extracting relevant portions thereof, evaluating the extracted metadata, and producing a report. The report is indicative of any potential issues for the type of issue corresponding to the given post-processor. In some scenarios, a new post-processor for a different type of issue can be produced that processes the set of artifacts without changing the test suite.

Thus, one test suite can be used to generate a set of artifacts that is relevant to multiple different types of potential application issues. Respective ones of different pluggable post-processors can be applied to the set of artifacts to discover issues that pertain to different respective issue types. In these manners, duplication of efforts and resources to produce multiple different test suites—such as one test suite per issue type—can be avoided.

Example implementations in various levels of detail are discussed below with reference to the associated figures. The discussion below first sets forth an example operating environment and then describes example schemes, techniques, and hardware. Example methods are described next with reference to various flow diagrams, and the discussion concludes with an example electronic device and aspects related thereto.

Example Environment

FIG. 1 illustrates an example environment 100 that includes an application analyzer 108 having an application runner 120 and multiple post-processors 116. The application analyzer 108 can implement application analysis with flexible post-processing. The environment 100 also includes at least one application 110. To realize or provide a platform for executing the application analyzer 108, the environment 100 further includes one or more electronic devices 102. As shown, there are multiple electronic devices 102-1 . . . 102-n, with "n" representing some positive integer. Each electronic device 102 includes at least one processor 104 and at least one computer-readable storage medium 106.

The storage medium 106 can store executable code, such as one or more programs, one or more modules, processor-executable instructions, at least one application, and so forth. Thus, the processor 104 can execute the code or processor-executable instructions to perform some method, effect a process, implement a scheme, realize at least a portion of the application analyzer 108, and so forth. An electronic device 102 can comprise a portable device, such as a smart phone or a notebook computer; a desktop computer; a server computer or rack; a portion of cloud computing resources; and so forth. Thus, in some implementations, at least a portion of the application analyzer 108 can be executed on a portable device. Alternatively, the application analyzer 108 can be executed on a workstation computer. In other implementations, the application analyzer 108 can be executed by a distributed computing system extracted from infrastructure providing cloud computing functionality. Further, in an example combined implementation, cloud infrastructure or a server computer interoperates with a portable device such as a tablet computer to realize the application analyzer 108. For instance, some application execution can be performed via emulation on server processors and some application execution can be performed on a mobile device targeted by the application. Also, the application analyzer 108 can be implemented fully or partially using a client-server architecture or using at least one library.

Regardless of how one or more of the multiple electronic devices 102-1 to 102-n are implemented, at least one electronic device 102 is used to realize the application analyzer 108. In example implementations, the application analyzer 108 includes at least one test suite 114, at least one post-processor 116, at least one binary manager 118, and at least one application runner 120. The application runner 120 can interact with multiple post-processors 116-1, 116-2 . . . 116-n, with "n" representing some positive integer. The variable "n" is used herein in various contexts, and a value thereof can be the same or different in the various contexts. The application runner 120 includes an application crawler 122 and a set of artifacts 124.

In example implementations, the binary manager 118 controls interactions between, or access to, the application runner 120, the test suite 114, the multiple post-processors 116-1 to 116-n, and the application 110. In a distributed computing environment, for instance, the binary manager 118 can launch the application runner 120, retrieve the test suite 114, and activate selected post-processors 116. The binary manager 118 can also load or otherwise provide access to the application 110. The application 110 provides or offers multiple features 112-1 to 112-n.

The features 112 enable certain functionalities, tools, interactions, and so forth to be provided to a user of the application 110. Features 112 can be described in terms of different relative levels or categories of abstraction. At a relatively higher level or category, a feature 112 may comprise electronic communication, word processing, image manipulation, web browsing, database management, and so forth. At a middle level or category, a feature 112 may comprise searching, taking a photo, providing a print preview, communicating with a printer, updating a display, updating a social media feed, accessing contacts, posting an item to a social network, and so forth. At a relatively lower level or category, a feature 112 may comprise accepting text input, displaying a "clickable" virtual button, zooming into a display, reading out text or providing other functionality for accessibility purposes, and so forth. However, the multiple features 112-1 to 112-n can be defined at different levels of abstraction or in alternative manners.

In operation, the binary manager 118 provides the application 110 to the application runner 120, which can run the application (e.g., execute the application or simulate execution of the application). The application crawler 122 interacts with the application 110 to test various features 112 from a user interaction perspective based on the contents of the test suite 114. User interaction and user interface (UI) screens are described below with reference to FIG. 2. During the execution of the application 110, the application crawler 122 collects metadata produced by the application 110.

From the metadata, the application runner 120 produces a set of artifacts 124. The set of artifacts 124 includes data that is organized to enable investigation into multiple types of issues pertaining to operation of the application. Each post-processor 116 is tailored to investigate a respective type of issue. Moreover, a new post-processor 116 can be added to investigate a new issue type without changing the test suite 114, or at least without rewriting the test suite 114.

The binary manager 118 can coordinate interactions between the various modules, applications, and other components while operating via the one or more processors 104 and the one or more storage media 106 of one or more of the multiple electronic devices 102-1 to 102-n. The processor 104 can execute processor-executable instructions or code stored by the computer-readable storage medium 106 to cause the at least one electronic device 102 to perform operations or implement various device functionalities. In some cases, the processor 104 is implemented as a general-purpose processor (e.g., a multicore central-processing unit (CPU)), an application-specific integrated circuit (ASIC), or a system-on-chip (SoC) in which other components of the electronic device can be integrated therein. In other cases, the processor 104 is implemented as multiple processor cores or a multicore processor configured to operate in parallel or as part of a distributed processing system.

The storage medium 106 may include any suitable type of memory media or storage media, such as read-only memory (ROM), programmable ROM (PROM), random access memory (RAM), dynamic RAM (DRAM), static RAM (SRAM), or Flash memory. In the context of this discussion, the storage medium 106 of the electronic device 102 is implemented as at least one hardware-based storage medium, which does not include transitory signals or carrier waves. In some cases, the storage medium 106 stores firmware, an operating system, modules, and/or applications of the electronic device 102 as instructions, code, or other information. The instructions or code can be executed by the processor 104 to implement various functionalities of the electronic device 102, such as those related to application analysis, software testing, problem reporting, software debugging, code optimization, combinations thereof, and so forth. In this example, the storage medium 106 stores processor-executable instructions or code to implement the application analyzer 108.

Example Schemes, Devices, and Components

Figure 2:
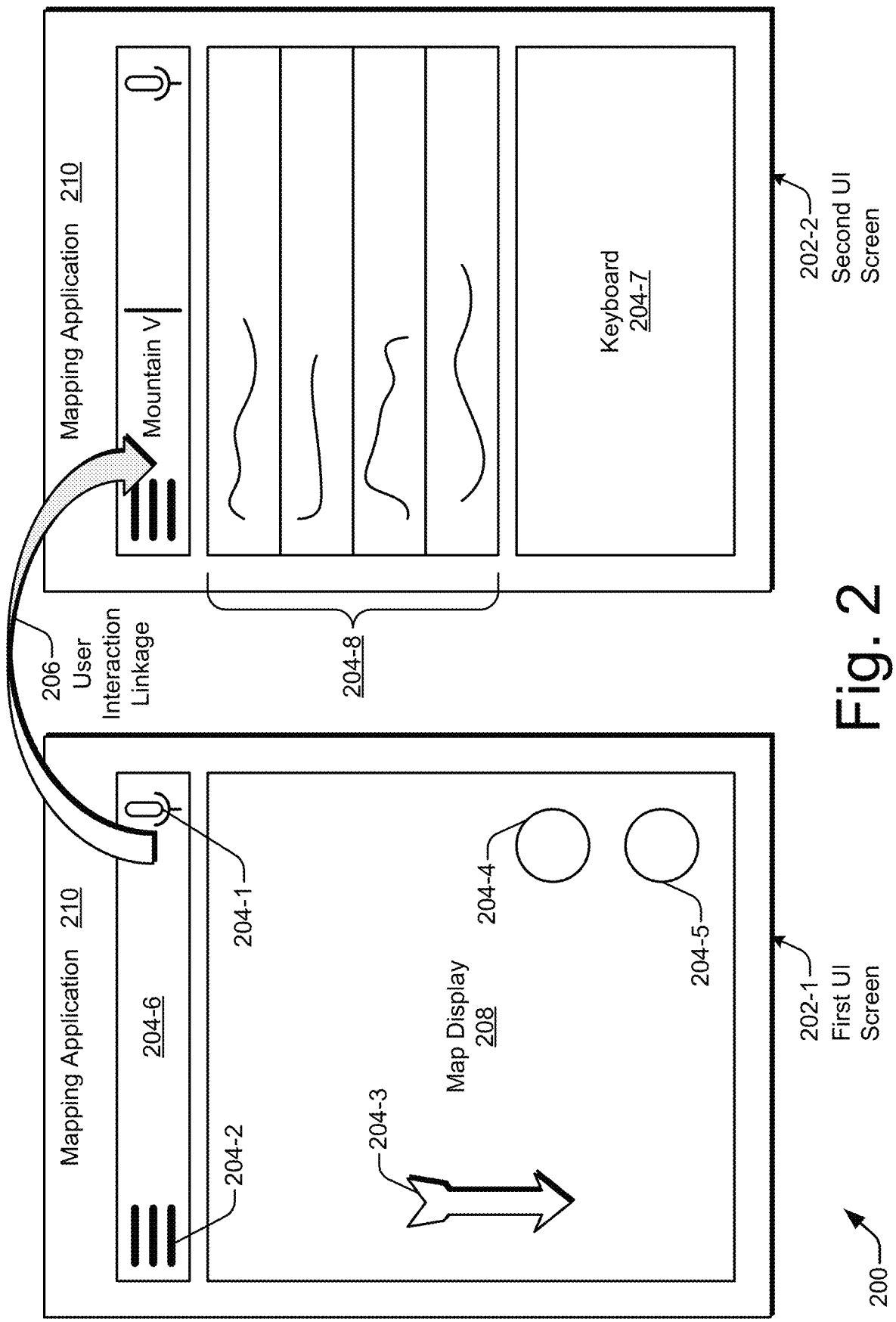
FIG. 2 depicts, for an example mapping application, two example user interface (UI) screens that illustrate a crawl between the two UI screens as part of an example application analysis.

FIG. 2 depicts, for an example mapping application 210, two example user interface (UI) screens 202 that illustrate an example crawl 200 between the two UI screens. Although this example focusses on the mapping application 210, the principles for crawling through different UI screens 202 are applicable or relevant to applications 110 generally. A first UI screen 202-1 is shown on the left, and a second UI screen 202-2 is shown on the right. Each UI screen 202 includes various UI elements that are visible to a user, or otherwise observable by a user (e.g., as haptic or auditory content). Some UI elements are capable of being observed, but not interacted with. Other UI elements, however, enable a user to interact with them. These UI elements are referred to herein as user interaction elements 204. Eight example user interaction elements 204 are explicitly indicated, but more or fewer may be present.

The first UI screen 202-1 includes an area for a map display 208. A text entry box 204-6 is above the map display 208. The text entry box 204-6 includes a menu activation element 204-2 and a voice interaction activation element 204-1. The area of the map display 208 includes multiple virtual buttons: an upper button 204-4 and a lower button 204-5. A swipe interaction element 204-3 may be present, even though it would not be visually depicted by an actual first UI screen 202-1. With a swipe interaction element generally (or a long-press, a pinch, or another multi-fingered gesture interaction), an application 110 can be affected by a user. For the mapping application 210, a downward motion that activates the swiping interaction element 204-3 scrolls the portion of the map that is visible in the map display 208.

The visible user interaction elements 204 can behave similarly to gesture-related interaction elements. For example, pressing the upper button 204-4 can activate a menu to change an appearance of the map display 208 (e.g., toggling from roads to terrain). Pressing the lower button 204-5 can activate a navigational function of the mapping application 210 (e.g., to display a box for entering a destination or a route on the map display 208 or to enable a pin-dropping feature). Pressing the menu activation element 204-2 can cause a drop-down or slide-out menu to be displayed that presents additional options, settings, or features that are made available by the mapping application 210. Pressing the voice interaction activation element 204-1 can cause the mapping application 210 to access a microphone of an associated device to detect sound and cause the corresponding spoken words to be displayed.

For the example crawl 200 of FIG. 2, the text entry box 204-6 is activated by, for instance, touching the text entry box 204-6. Touching the text entry box 204-6 causes a corresponding user interaction linkage 206 to be followed or navigated from the first UI screen 202-1 to the second UI screen 202-2. Here, the activation of the text entry box 204-6 causes a different UI screen 202 to be displayed. First, a keyboard 204-7 is presented in the second UI screen 202-2. The keyboard 204-7 enables user entry of text into the text entry box 204-6. Second, the addition of text (e.g., "Mountain V . . . ") causes a suggestions list 204-8 to be displayed, which suggestions list 204-8 can be initially populated by previous entries. The suggestions list 204-8 can also serve as a user interaction element 204 because selection of a suggestion elevates that selected suggestion into the text entry box 204-6 and can initiate an associated search or display for the suggestion.

Thus, the navigation over the user interaction linkage 206 produces a new UI screen 202 that differs from the previous UI screen 202 in at least one non-trivial way (e.g., by more than text, by the addition of a different user interaction element 204, and so forth). Generally, as part of an application analysis, the application crawler 122 (as a component of the application runner 120 of FIG. 1) causes an application 110 to create each UI screen 202 by looking for, identifying, and then activating various user interaction elements 204 based on a test suite 114. Thus, the application crawler 122 crawls the application 110 as part of an execution thereof from a user interaction perspective. Additional example implementations of the application runner 120 are described below with reference to FIG. 3.

Figure 3:
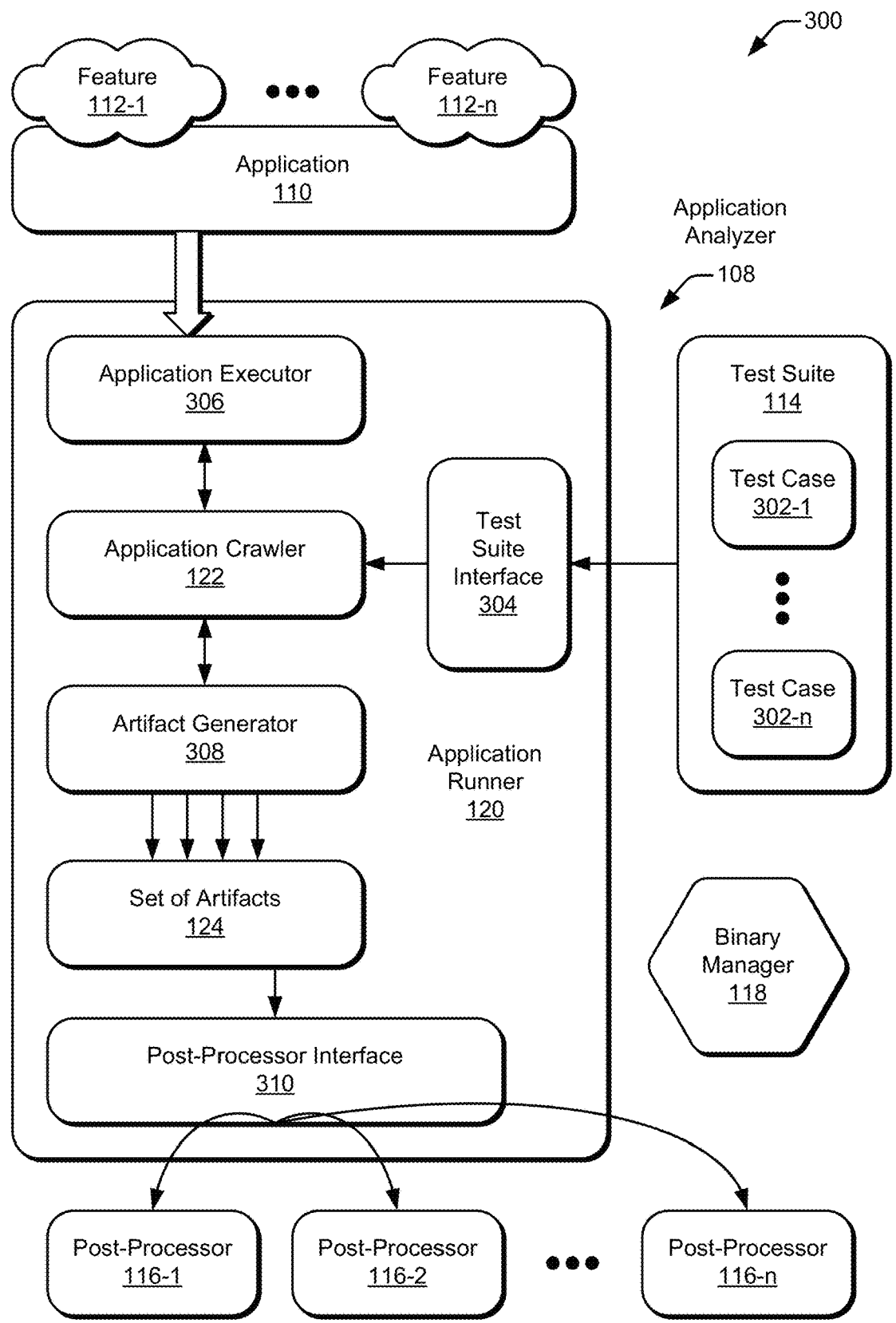
FIG. 3 illustrates an example application runner that includes an application crawler and an artifact generator that can generate a set of artifacts.

FIG. 3 illustrates generally at 300 an example application runner 120 that includes an application crawler 122 and an artifact generator 308. As illustrated, the application runner 120 also includes a test suite interface 304, an application executor 306, and a post-processor interface 310. The test suite 114 includes multiple test cases 302-1 to 302-n, with "n" representing some positive integer. In some implementations, each test case 302 is designed to target or test at least one feature 112 of the application 110. To fully test a given feature 112, especially one defined at a relatively higher or middle level, multiple test cases 302 may target different aspects of a given feature 112 or target the given feature 112 under different scenarios or application modes. Thus, the "n" features 112 may have a quantity that is different from the "n" test cases 302.

In example operations, the application executor 306 causes the application 110 to execute. The application executor 306 may execute the application 110 on the actual hardware that the application 110 is to be disseminated to (e.g., a targeted electronic device), in a virtual machine of a server electronic device, using a platform provided by cloud computing functionality, and so forth. The application crawler 122 interacts with the application executor 306 so that the multiple test cases 302 can be applied to the execution of the application 110. To do so, the application crawler 122 receives the test cases 302 from the test suite interface 304. In effect, the test suite interface 304 obtains the test suite 114 and forwards the multiple test cases 302 to the application crawler 122.

Thus, based on the test suite 114 and using the application executor 306, the application crawler 122 crawls the application 110 across multiple UI screens 202 from a user interaction perspective, as described above with reference to FIG. 2. During the crawling, the application crawler 122 causes the execution to produce metadata, such as UI screens 202 and application state data, which are described below with reference to FIGS. 4 and 5. Using the metadata, the artifact generator 308 generates a set of artifacts 124. The set of artifacts 124 can include at least a portion of the metadata in a form that is organized to be accessible by multiple post-processors 116. For example, the set of artifacts 124 can enable the metadata to be explored so that each different post-processor 116 can extract and evaluate the particular metadata that is pertinent to the type of issue with which the post-processor 116 is designed to analyze. The post-processor interface 310 provides a mechanism for each post-processor 116 of multiple different types of post-processors 116-1 to 116-n to access the set of artifacts 124.

Figure 4:
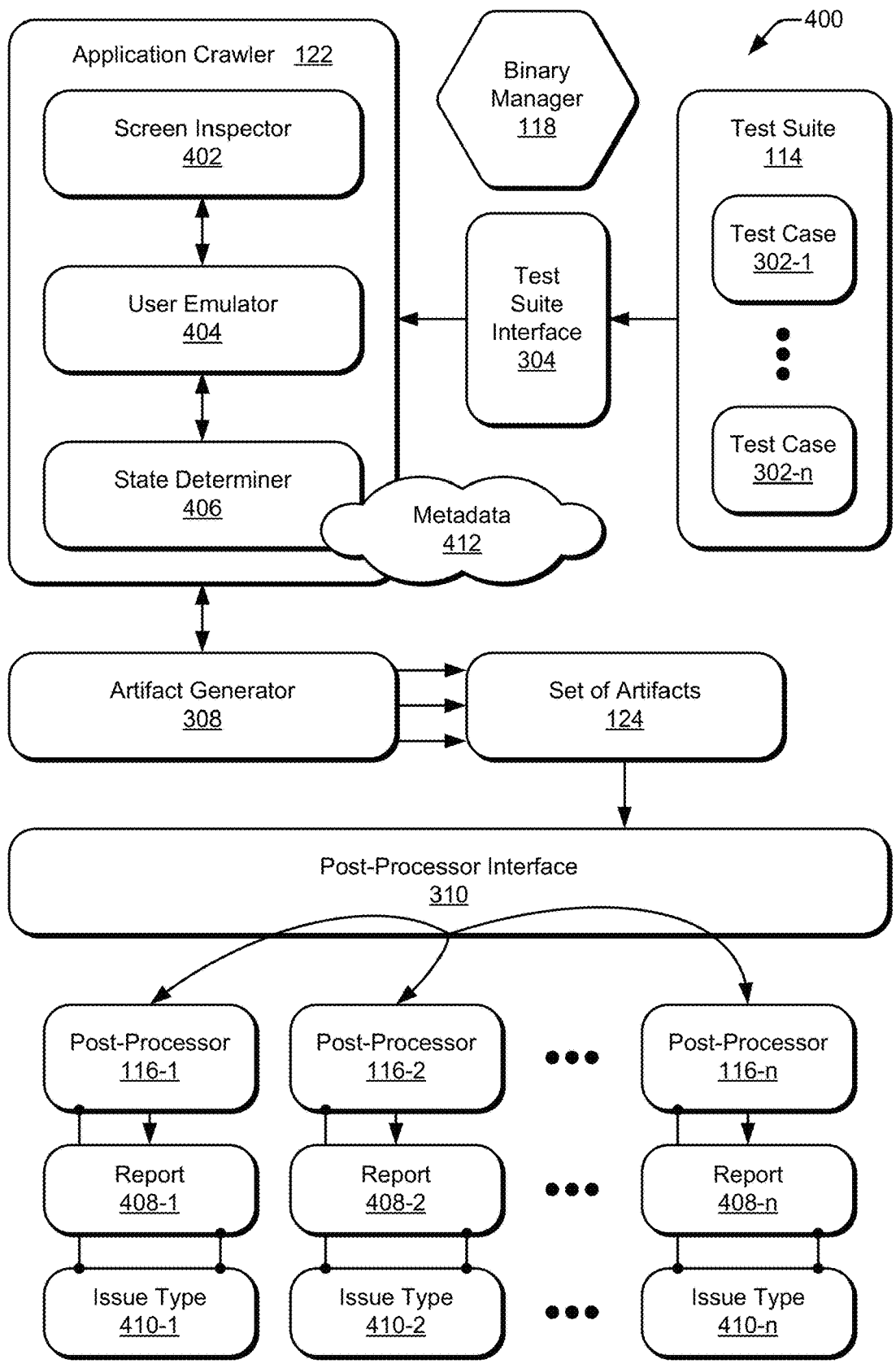
FIG. 4 illustrates an example application crawler in conjunction with an artifact generator and multiple post-processors that can each produce a respective report of multiple reports.

FIG. 4 illustrates generally at 400 an example application crawler 122 in conjunction with an artifact generator 308 and multiple post-processors 116-1 to 116-n. As shown, the application crawler 122 includes a screen inspector 402, a user emulator 404, and a state determiner 406. Each respective post-processor 116 of the multiple post-processors 116-1 to 116-n corresponds to a respective issue type 410 of the multiple issue types 410-1 to 410-n, with "n" representing some positive integer. FIG. 4 also depicts multiple reports 408-1 to 408-n, with "n" representing some positive integer. Although the variable "n" is used in various situations for multiple components throughout this disclosure, a numerical value for the variable "n" may differ both for different components and in different situations.

In example operations, the screen inspector 402 inspects a UI screen 202 (of FIG. 2) to locate a user interaction element 204 thereof. The user emulator 404 activates the user interaction element 204 in accordance with at least one test case 302. The state determiner 406 determine multiple application states from multiple UI screens 202. For example, the state determiner 406 can ascertain if changes to a UI screen are sufficient to identify the UI screen as a new application state (e.g., mere changes to text are usually insufficiently substantial to warrant identification of a new application state). Additionally or alternatively, the state determiner 406 can determine metadata 412 for each application state of the multiple application states.

In example implementations, the application states, UI screen snapshots, and other metadata 412 are provided from the application crawler 122 to the artifact generator 308. The artifact generator 308 generates the set of artifacts 124 from the metadata 412. The post-processor interface 310 provides access to the set of artifacts 124 to multiple post-processors 116-1 to 116-n. Thus, the post-processing can be separated from the application runner 120 (e.g., as shown in FIG. 3) and/or the test suite 114. This enables the post-processing to be modifiable and extensible without substantially changing the execution or simulation code or significantly rewriting the test suite 114. Consequently, the time and resources invested in the test suite 114 can be reused.

Further, each post-processor 116 can be tuned to consider a different issue type 410. The types of issues 410 pertain to different respective types of problems that can potentially impact operation of the application 110 being analyzed. Example types of issues 410 include user interface issues, accessibility issues, memory usage issues, network usage issues, stability issues, processor utilization issues, string-compression issues, and so forth. User interface issues can include whether the UI elements are visible, avoid overlapping with each other, and so forth. Accessibility issues (e.g., "A11Y" or "a11y" issues) can relate to whether a user interaction element 204 has been properly coded to provide enhanced accessibility. For instance, each virtual button or other user interaction element 204 can be coded to aurally describe its function or purpose. Memory usage issues can include memory leak issues, memory spike, memory localization issues, and so forth. Network usage can include frequency of access, average bandwidth, and so forth. Stability issues pertain to whether an application crashes, can handle unexpected inputs gracefully, and so forth. Processor utilization issues can relate to how much time or what percentage of time or processing capability an application consumes.

A post-processor 116 can also modify (e.g., expand or update) the set of artifacts 124. Another post-processor 116 can then access the modified set of artifacts 124. The modifying post-processor 116 can store an indication of the modifications. In other aspects, a custom post-processor 116 can be created for an application 110 that analyzes operation of application-specific features 112, such as intended arrangements or interrelationships among particular UI elements.

In some implementations, each respective post-processor 116 of the multiple post-processors 116-1 to 116-n corresponds to a respective issue type 410 of the multiple issue types 410-1 to 410-n. Each respective post-processor 116 of the multiple post-processors 116-1 to 116-n produces a respective report 408 of the multiple reports 408-1 to 408-n. Thus, each respective report 408 of the multiple reports 408-1 to 408-n also corresponds to a respective issue type 410 of the multiple issue types 410-1 to 410-n, such as UI issues or memory usage issues. Example approaches to the artifact generator 308 generating a set of artifacts 124 for post-processing are described below with reference to FIG. 5. Example approaches to implementing a post-processor 116 and applying the post-processor 116 to the set of artifacts 124 to produce a report 408 are described below with reference to FIG. 6. Example automated approaches to reviewing the multiple reports 408-1 to 408-n are described below with reference to FIG. 7.

Figure 5:
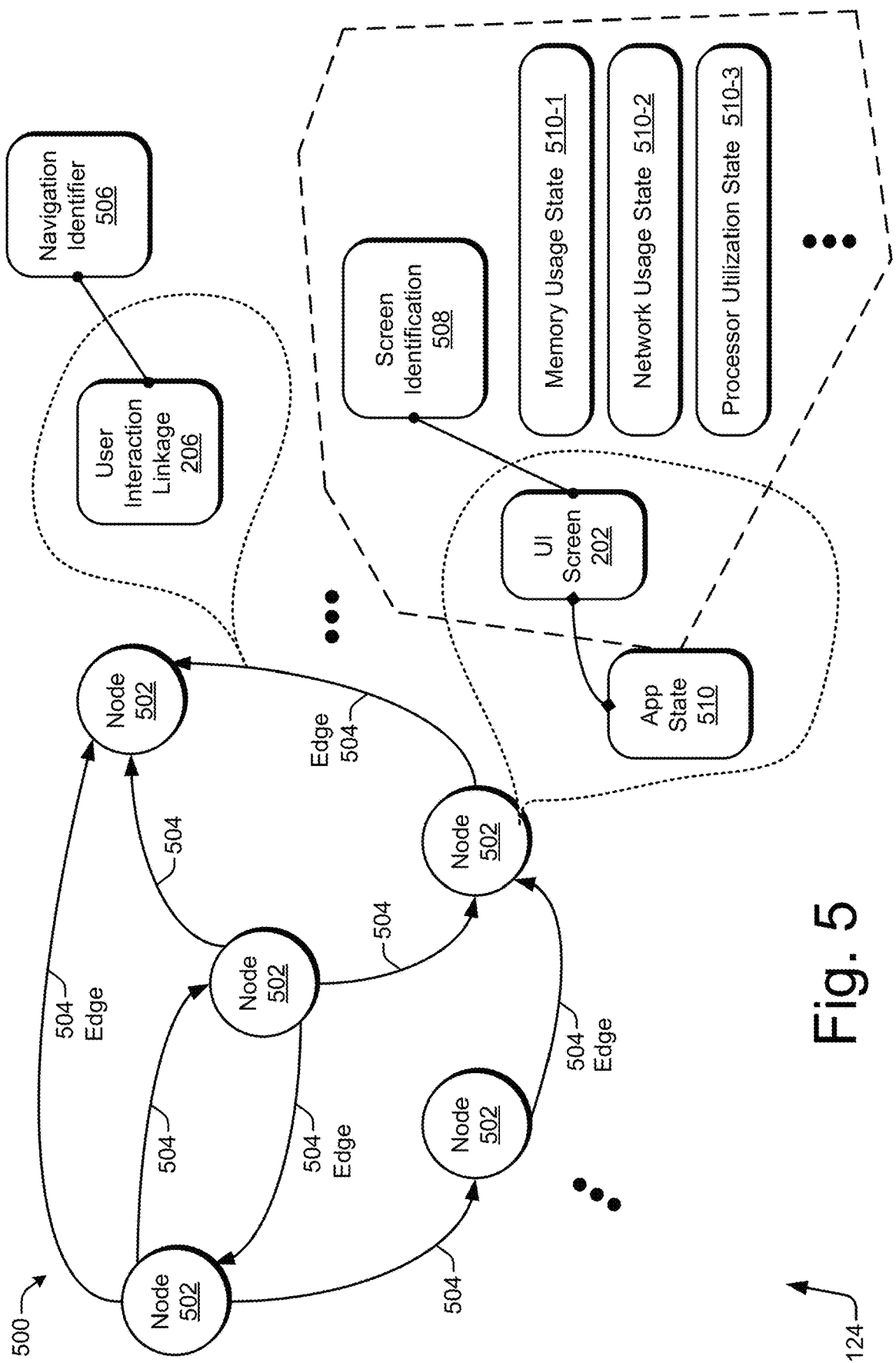
FIG. 5 illustrates an example set of artifacts that is depicted as a directed graph having multiple nodes and edges that can be representative of UI screens and UI linkages therebetween.

FIG. 5 illustrates an example set of artifacts 124 that is organized as a directed graph 500 having multiple nodes 502 and multiple edges 504. In some implementations, each node 502 represents an application state 510 or corresponds to a UI screen 202. Each edge 504 represents or corresponds to a user interaction linkage 206. Thus, the application crawler 122 (e.g., of FIGS. 3 and 4) obtains the metadata 412 as the crawl 200 (of FIG. 2) is expanded by navigating between different UI screens 202 via various user interaction elements 204 using multiple user interaction linkages 206. Further, the artifact generator 308 organizes the resulting metadata 412 into the directed graph 500 to produce the set of artifacts 124.

In example implementations, the artifact generator 308 overlays identifying information on parts of the directed graph 500. Each UI screen 202 of each respective node 502 is assigned a screen identification 508, which can be based on one or more names or identifiers of the user interaction elements 204 that are included in the UI screen 202. The artifact generator 308 also assigns a navigation identifier 506 to each user interaction linkage 206 corresponding to each edge 504. In some implementations, the navigation identifier 506 for an edge 504 can be derived from the screen identifications 508 of the origin and destination sides of the edge 504. For instance, a screen identification 508 of an origin node 502 from which an edge 504 originates can be concatenated with a screen identification 508 of a destination node 502 to which the edge 504 points to produce a navigation identifier 506 for the edge 504.

With reference also to FIG. 2, a user interaction element 204 can also be assigned an identifier (not shown), such as one that includes a navigation identifier 506 for a corresponding user interaction linkage 206 in combination with other information. In some aspects, the graph 500 can contain a list of triples. Each triple is a three-element data structure. A current screen is included because a stable screen identifier, the screen identification 508, is generated. Thus, each triple has a screen identification 508 to represent the current state. Specifically, the triple can have a current state, a transition action in the middle, and finally a destination state. In other words, using a triple and starting from a current state, an action is performed to transition to a destination state.

In example operations, the artifact generator 308 works with the application crawler 122 to produce the directed graph 500 from the metadata 412 that is created during the crawl 200 (of FIG. 2). The artifact generator 308 captures a snapshot of the UI screen 202 for each determined state of the application 110. The artifact generator 308 also obtains and records data representative of the application state 510 for the included or associated UI screen 202. Different types of state data can be obtained for the application state 510 to account for different types of issues 410 that a given post-processor 116 may be looking for or to otherwise more fully provide a picture of how an application is impacting an electronic device. Examples of the application state 510 include: a memory usage state 510-1, a network usage state 510-2, a processor utilization state 510-3, and so forth. In some implementations, the UI screen 202 represents the state, and the application state 510 can correspond to the UI screen 202. In other implementations, the application state 510 can include the UI screen 202.

Figure 6:
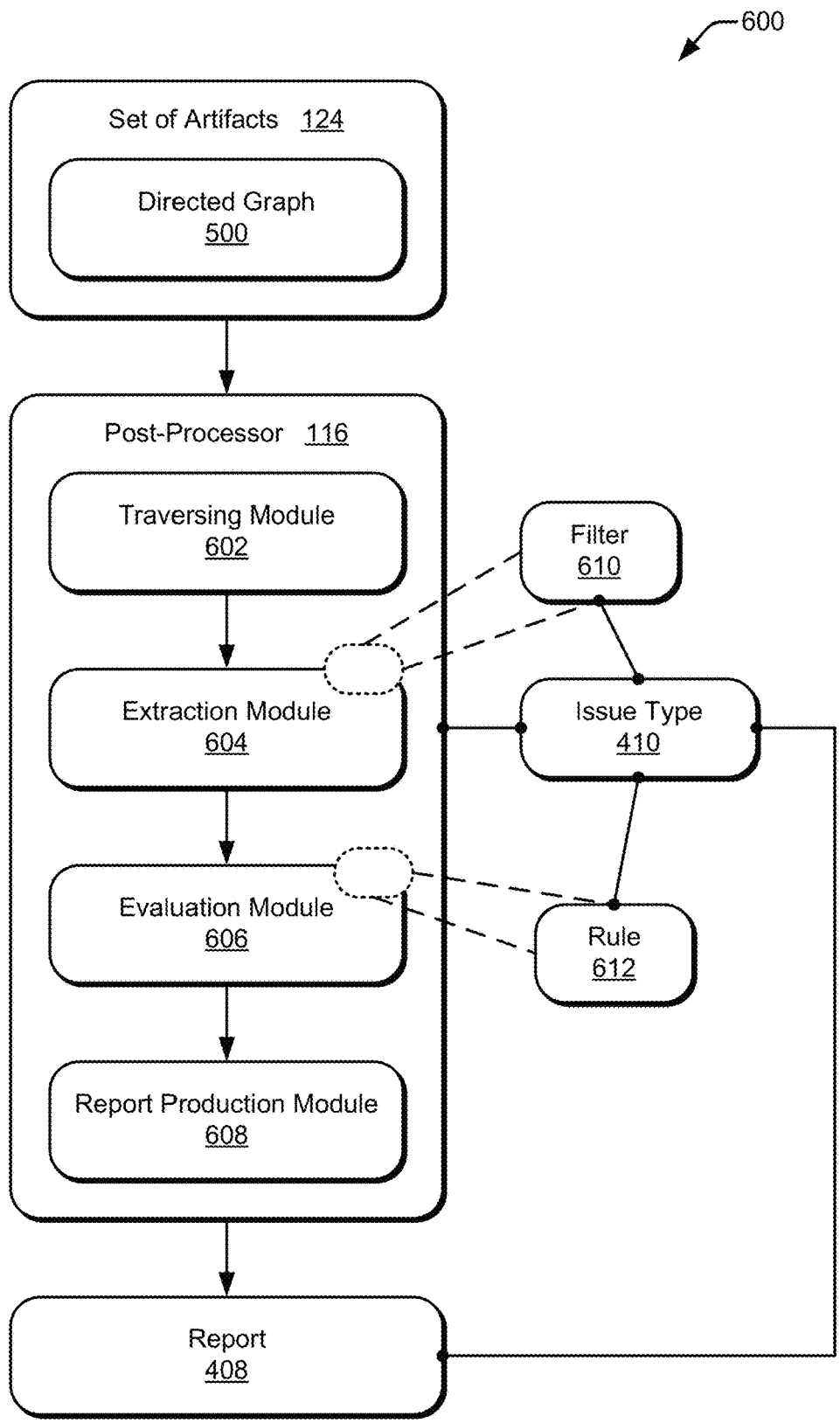
FIG. 6 illustrates an example post-processor that can process a set of artifacts in accordance with a corresponding type of issue to produce a report for that type of issue.

FIG. 6 illustrates generally at 600 an example post-processor 116 that can process a set of artifacts 124 in accordance with a corresponding type of issue 410 to produce a report 408. The set of artifacts 124 includes a directed graph 500. In example implementations, the post-processor 116 includes a traversing module 602, an extraction module 604, an evaluation module 606, and a report production module 608. Each module includes one or more parameters that specify how metadata is handled relative to a corresponding type of issue 410. In operation, the traversing module 602 traverses the set of artifacts 124 to obtain state data resulting from the simulated or emulated user execution of the application 110 that is being analyzed. Here, the metadata 412 of FIG. 4 is organized as the directed graph 500, so the traversing module 602 traverses the directed graph 500 to analyze the nodes 502 thereof.

The extraction module 604 includes at least one filter 610. The filter 610 is tuned to a type of issue 410 corresponding to the post-processor 116. Thus, the extraction module 604 can extract from the directed graph 500 traversed state data based on the filter 610. For example, the extraction module 604 can use the filter 610 to affirmatively identify data items that are relevant to the corresponding issue type 410 or to exclude data items that are not relevant to the corresponding issue type 410 (e.g., processor utilization data may be omitted for a memory usage issue type). Updating parameters of the filter 610 can therefore adjust which data items are extracted.

The evaluation module 606 evaluates the extracted state data based on the type of issue 410 corresponding to the post-processor 116 using one or more rules 612. Each rule 612 is likewise based on the type of issue 410. For example, a rule 612 may include an instantaneous threshold for memory spike issues or an algorithm to detect if two different user interaction elements 204 overlap one another. Updating parameters of a rule 612 of the evaluation module 606 can therefore adjust which data items are considered to violate or comport with a guideline of the corresponding issue type 410. Example evaluations and associated rules 612 are described below. The report production module 608 produces the report 408 using the evaluated state data from the evaluation module 606. The report 408 is indicative of one or more problematic issues with an operation of the application 110 that pertain to the type of issue 410 corresponding to the post-processor 116.

Example scenarios are described here for post-processors 116 with different respective example issue types 410 and therefore different filters 610 or rules 612. First, for an example user interface issue, the filter 610 of the extraction module 604 identifies UI elements of each traversed screenshot of a UI screen 202. The evaluation module 606 evaluates each identified UI element for appearance purposes based on one or more rules 612. For instance, the evaluation module 606 can evaluate identified UI elements to ensure that each UI element that is intended to be visible is in a top display layer and/or not overlapping another UI element. Generally, the report production module 608 can add an entry to the report 408 for each UI element that fails to meet a designated set of UI element guidelines.

Second, for an example accessibility issue, the filter 610 of the extraction module 604 identifies UI elements of each traversed screenshot of a UI screen 202. The evaluation module 606 evaluates each UI element to ensure that each UI element comports with each accessibility rule 612 relevant to that UI element. For instance, the UI element may be checked to verify that the UI element has text earmarked to be read aloud to describe its function. Generally, the report production module 608 can include in the report 408 an entry for each UI element that fails to meet the designated accessibility rules along with an indication of which rule 612 is violated.

Third, for an example memory usage issue, the filter 610 of the extraction module 604 identifies memory usage state data 510-1 (of FIG. 5) from the application states 510 of multiple nodes 502. The evaluation module 606 compares recorded memory usage values to at least one memory utilization threshold of a rule 612. The memory utilization threshold may be expressed in terms of an amount of memory that is currently storing data for the application 110, a range of addresses over which the application is storing data (even if there are addressable locations that are available within that range), a rate of memory access or bandwidth, and so forth. If a memory usage value extracted from the memory usage state data 510-1 exceeds the memory utilization threshold of a rule 612, then evaluation module 606 can issue a violation notice or an alert. Based on the notice or alert, the report production module 608 can include in the report 408 an entry for an issue identifying the memory state 510 or the node 502 and providing indicia of the problem with the memory usage issue (e.g., an alert for average memory utilization or an alert for highest instantaneous memory utilization, such as a memory spike).

Figure 7:
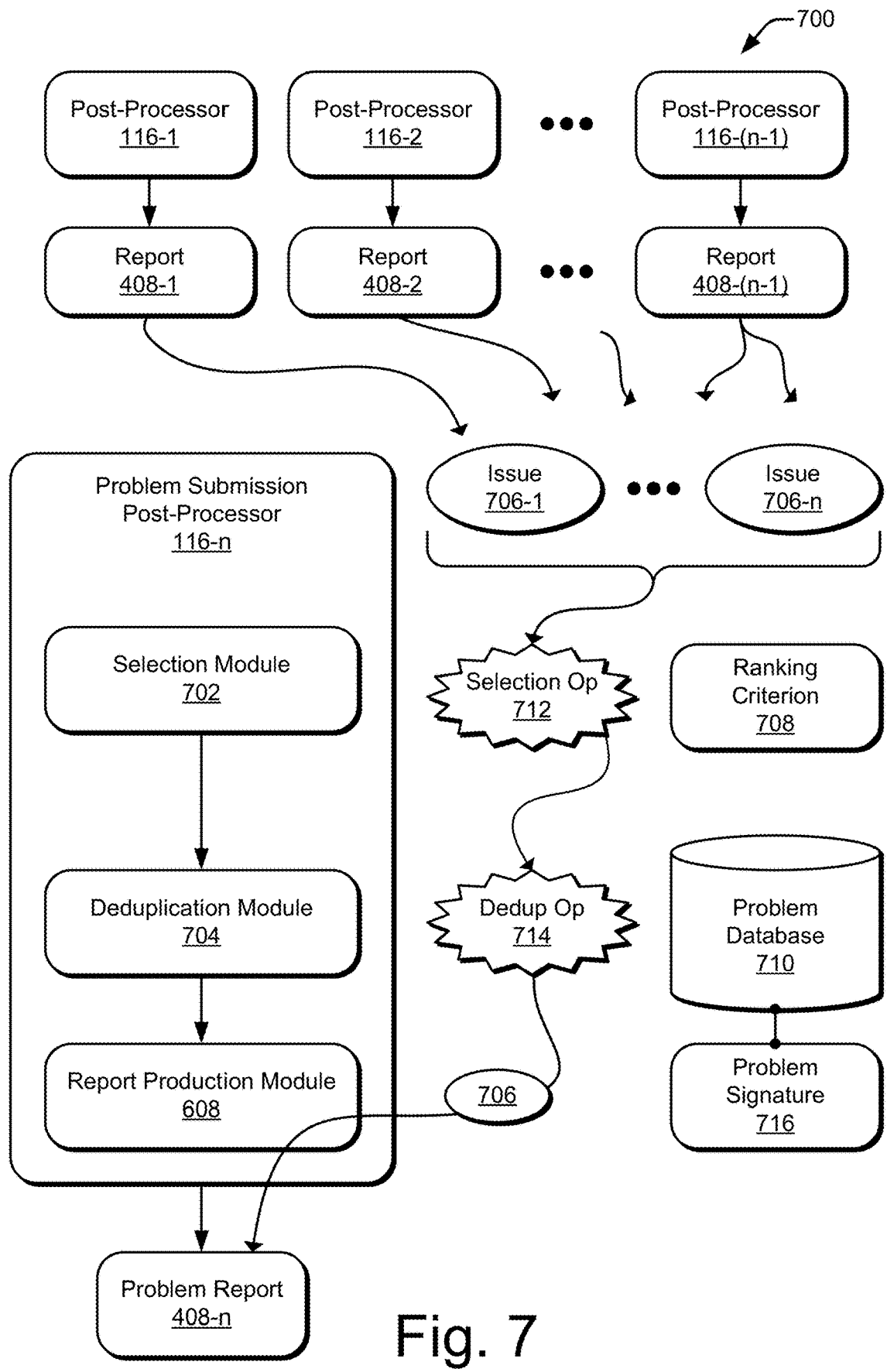
FIG. 7 illustrates an example problem submission post-processor for handling issues reported by one or more other post-processors to identify those more pertinent for manual consideration.

FIG. 7 illustrates, generally at 700, an example problem submission post-processor 116-n for handling issues 706 reported by one or more other post-processors 116 to identify those issues 706 that are more pertinent for manual consideration. With a company or another entity having a large application 110 or many applications 110 under analysis, an automated report-production system can result in numerous issues to be considered manually by programmers, application debuggers, and other software engineers. Because time and resources are limited, software engineers may not be able to review each and every reported issue. To accommodate this potentially overwhelming scenario, a problem submission post-processor 116-n can be implemented to produce a problem report 408-n that identifies, for manual consideration by software engineers, issues 706 that are inferred to be more pertinent.

As shown in FIG. 7, an example problem submission post-processor 116-n includes a selection module 702, a deduplication module 704, and a report production module 608. Each other post-processor 116 of multiple post-processors 116-1 to 116-(n-1) produces a respective report 408 of multiple reports 408-1 to 408-(n-1). Each report 408 includes at least one issue 706, and many reports 408 may individually include dozens or even hundreds of issues 706. Thus, the problem submission post-processor 116-n can be responsible for processing "n" issues 706-1 . . . 706-n, with "n" representing an integer that can reach into the thousands or higher.

In example implementations, the problem submission post-processor 116-n can operate on the issues 706 of each report 408 sequentially or of the multiple reports 408-1 to 408-(n-1) in parallel. In operation, the selection module 702 performs a selection operation 712 based on at least one ranking criterion 708. The selection module 702 can rank issues 706 based on the ranking criterion 708. For issue analysis using an inter-post-processor ranking scheme, a crash issue 706 can be assigned a higher priority than a memory spike issue 706 in accordance with one ranking criterion 708. For issue analysis using an intra-post-processor ranking scheme, relative sizes of memory spikes or relative amounts of UI element overlap can be used as different ranking criteria 708. Other schemes can alternatively be implemented.

As part of the selection operation 712, an issue cap threshold can also be instituted that sets a maximum number of issues to be selected as reportable problems for forwarding to software engineers. The cap threshold can be relative to a given application version or during any single time period (e.g., each day). Thus, the selection module 702 can prioritize the importance of issues using at least one ranking criterion 708 and apply a cap threshold to facilitate a narrowing of the issues 706 that are to be reported as problems for manual consideration. These selected issues 706 are made available to the deduplication module 704.

The deduplication module 704 performs a deduplication operation 714 on the selected issues to remove duplicate problem issues and thereby produce deduplication results. To do so, the deduplication module 704 can access a problem database 710 that includes multiple issues 706, each of which is stored in association with a respective problem signature 716. The application state 510 or other state data, for instance, can be used to compute a problem signature 716 for each issue 706 under analysis—e.g., each issue that has been previously forwarded for manual consideration or each issue currently being processed as a selected issue. In some aspects, the deduplication module 704 can rely on structured data to measure a similarity between a newly selected issue and an existing issue. For example, structured data can include stack traces for crashes and leak traces for memory leaks. If the problem signatures 716 for two issues are identical or sufficiently close (e.g., based on a similarity threshold), one of the two issues (e.g., the newer one or the one with less state data) can be omitted from reporting. In this manner, the deduplication module 704 can remove duplicate issues to save software engineers additional time. In alternative implementations, the deduplication operation 714 can be performed prior to the selection operation 712 or at least partially in parallel.

Those issues 706 that are not filtered out by the selection operation 712 or diverted by the deduplication operation 714 are passed to the report production module 608. The report production module 608 produces the problem report 408-*n* with problem issues 706 that include fewer than all of the multiple issues 706-1 to 706-*n* to facilitate manual consideration of those issues 706 that are determined to be more important and non-duplicative. In these manners, the problem-submission post-processor 116-*n* can review the reports 408-1 to 408-(*n*−1) provided by other post-processors 116-1 to 116-(*n*−1) to produce a problem report 408-*n* that identifies more pertinent issues 706 that are highlighted for manual consideration by software engineers. The problem report 408-*n* can present the reported issues 706 in an inferred order of importance based on the at least one ranking criterion 708.

Having generally described example schemes and apparatuses for application analysis with flexible post-processing, this discussion now turns to example methods.

Example Methods

Example methods are described below with reference to various flow diagrams of FIGS. 8 and 9. These methods relate to application analysis with flexible post-processing. Aspects of these methods may be implemented in, for example, hardware (e.g., fixed logic circuitry or general-purpose processors), firmware, or some combination thereof. These techniques may be realized using one or more of the electronic devices or components shown in FIG. 1-7 or 10 (an electronic device 1000 is described in FIG. 10 below), which devices or components may be further divided, combined, and so on. The electronic devices and components of these figures generally represent firmware, hardware, IC chips, circuits, or a combination thereof. Thus, these figures illustrate some of the many possible systems or apparatuses capable of implementing the described techniques.

For these flow diagrams, the orders in which operations are shown and/or described are not intended to be construed as a limitation. Any number or combination of the described method operations can be combined in any order to implement a method, or an alternative method. Further, described operations can be implemented in fully or partially overlapping manners.

Figure 8:
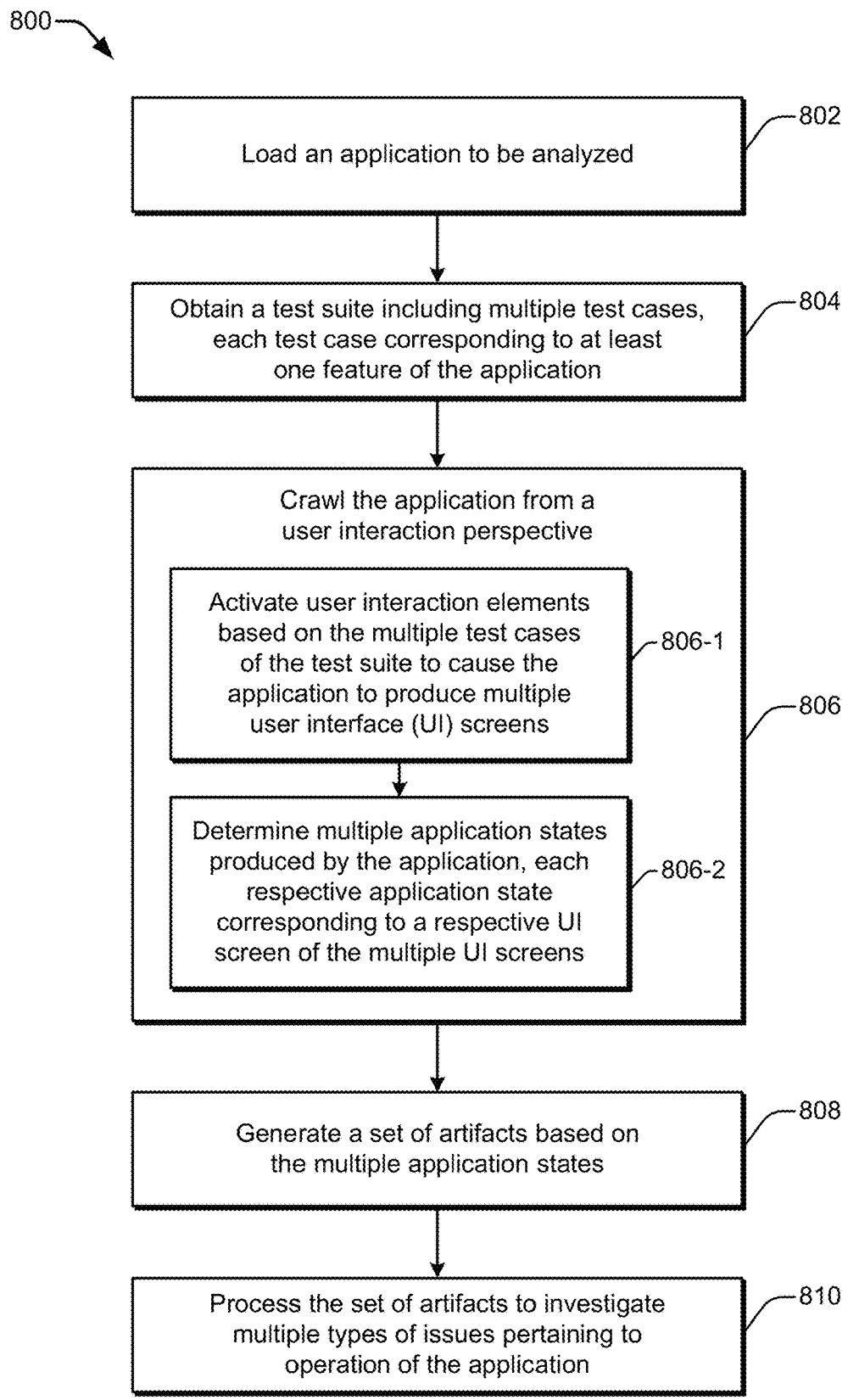
FIG. 8 illustrates example methods for implementing application analysis with flexible post-processing.

FIG. 8 illustrates example methods for implementing application analysis with flexible post-processing at a flow diagram 800. The flow diagram 800 includes five operations 802-810. At 802, an application to be analyzed is loaded. For example, a binary manager 118 or an application executor 306 can load an application 110 that is to be analyzed. At 804, a test suite including multiple test cases is obtained, with each test case corresponding to at least one feature of the application. For example, a test suite interface 304 can obtain a test suite 114 including multiple test cases 302-1 to 302-*n*, with each test case 302 corresponding to at least one feature 112 of the application 110.

At 806, the application is crawled from a user interaction perspective. For example, the application crawler 122 can crawl the application 110 from a user interaction perspective. For instance, a screen inspector 402 can identify user interaction elements 204 on different UI screens 202. At 806-1, user interaction elements are activated based on the multiple test cases of the test suite to cause the application to produce multiple user interface (UI) screens. For example, a user emulator 404 can activate user interaction elements 204 to cause the application 110 to produce multiple UI screens 202 based on the multiple test cases 302 of the test suite 114. At 806-2, multiple application states that are produced by the application are determined, with each respective application state corresponding to a respective UI screen of the multiple UI screens. For example, a state determiner 406 can determine multiple application states 510 produced by the application 110. Each respective application state 510 corresponds to a respective UI screen 202 of the multiple UI screens 202.

At 808, a set of artifacts is generated based on the multiple application states. For example, an artifact generator 308 can generate a set of artifacts 124 based on the multiple application states 510. Here, the multiple application states 510 can include snapshots of the multiple UI screens 202 as well as the state data. At 810, the set of artifacts is processed to investigate multiple types of issues pertaining to operation of the application. For example, after the crawling of the application 110 by the application crawler 122, the multiple post-processors 116-1 to 116-*n* can process the set of artifacts 124 to respectively investigate multiple types of issues 410-1 to 410-*n* that pertain to operation of the application 110. The operation of the application 110 may relate to aspects of the application 110 that are readily apparent to a user (e.g., visual aspects, speed of operation, or stability) or aspects that are not readily apparent to a user (e.g., network usage, processor utilization, multi-threading implementation, or memory usage).

Figure 9:
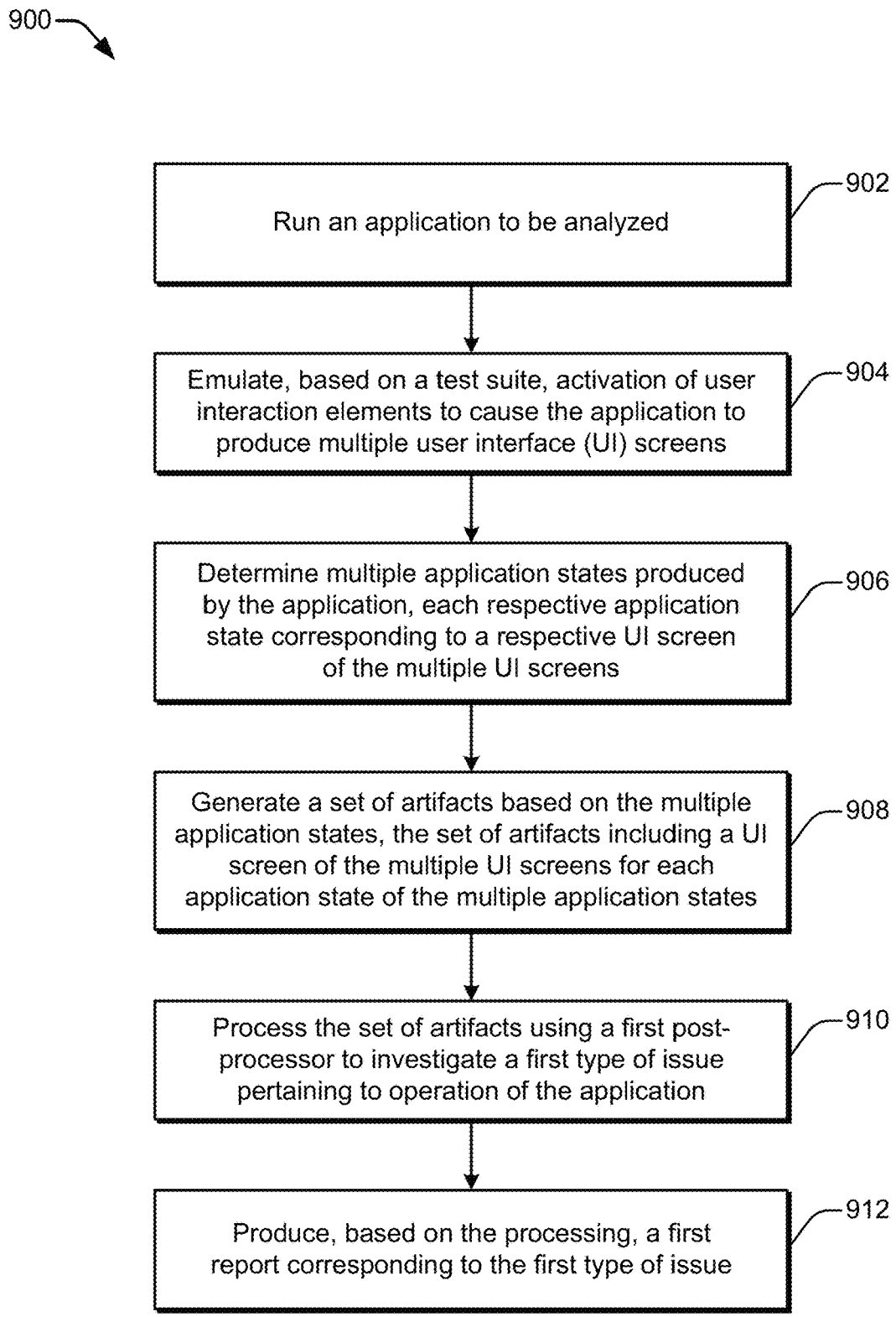
FIG. 9 illustrates other example methods for implementing application analysis with flexible post-processing.

FIG. 9 illustrates example methods for implementing application analysis with flexible post-processing at a flow diagram 900. The flow diagram 900 includes six operations 902-912. At 902, an application to be analyzed is run. For example, an application runner 120 can use an application executor 306 to execute (e.g., run on native or target hardware; run on other, general hardware; or simulate execution) of an application 110 that is to be analyzed. At 904, based on a test suite, activation of user interaction elements is emulated to cause the application to produce multiple user interface (UI) screens. For example, based on a test suite 114 that is obtained via a test suite interface 304, a user emulator 404 of an application crawler 122 can activate user interaction elements 204 to cause the application 110 to produce multiple UI screens 202 by traversing user interaction linkages 206.

At 906, multiple application states that are produced by the application are determined, with each respective application state corresponding to a respective UI screen of the multiple UI screens. For example, a state determiner 406 of the application crawler 122 can determine multiple application states 510 that are produced by the application 110. Here, each respective application state 510 can correspond to a respective UI screen 202 of the multiple UI screens 202. At 908, a set of artifacts is generated based on the multiple application states, with the set of artifacts including a UI screen of the multiple UI screens for each application state of the multiple application states. For example, an artifact generator 308 can generate a set of artifacts 124 based on the multiple application states 510. The set of artifacts 124 can include a UI screen 202 of the multiple UI screens 202 for each application state 510 of the multiple application states 510. The set of artifacts 124 can be formulated as a directed graph 500 in which nodes 502 represent application states 510 or UI screens 202 and edges 504 represent transitions between states and screens.

At 910, the set of artifacts is processed using a first post-processor to investigate a first type of issue pertaining to operation of the application. For example, a first post-processor 116-1 can process the set of artifacts 124 to investigate a first type of issue 410-1 pertaining to operation of the application 110. At 912, based on the processing, a first report corresponding to the first type of issue is produced. For example, the first post-processor 116-1 can produce a first report 408-1 corresponding to the first type of issue 410-1. Further, a second post-processor 116-2 can process the set of artifacts 124 to investigate a second type of issue 410-2 and produce a second report 408-2 corresponding to the second type of issue 410-2. The first and second post-processors 116-1 and 116-2 can operate sequentially or at least partially in parallel.

Example Electronic Device

Figure 10:
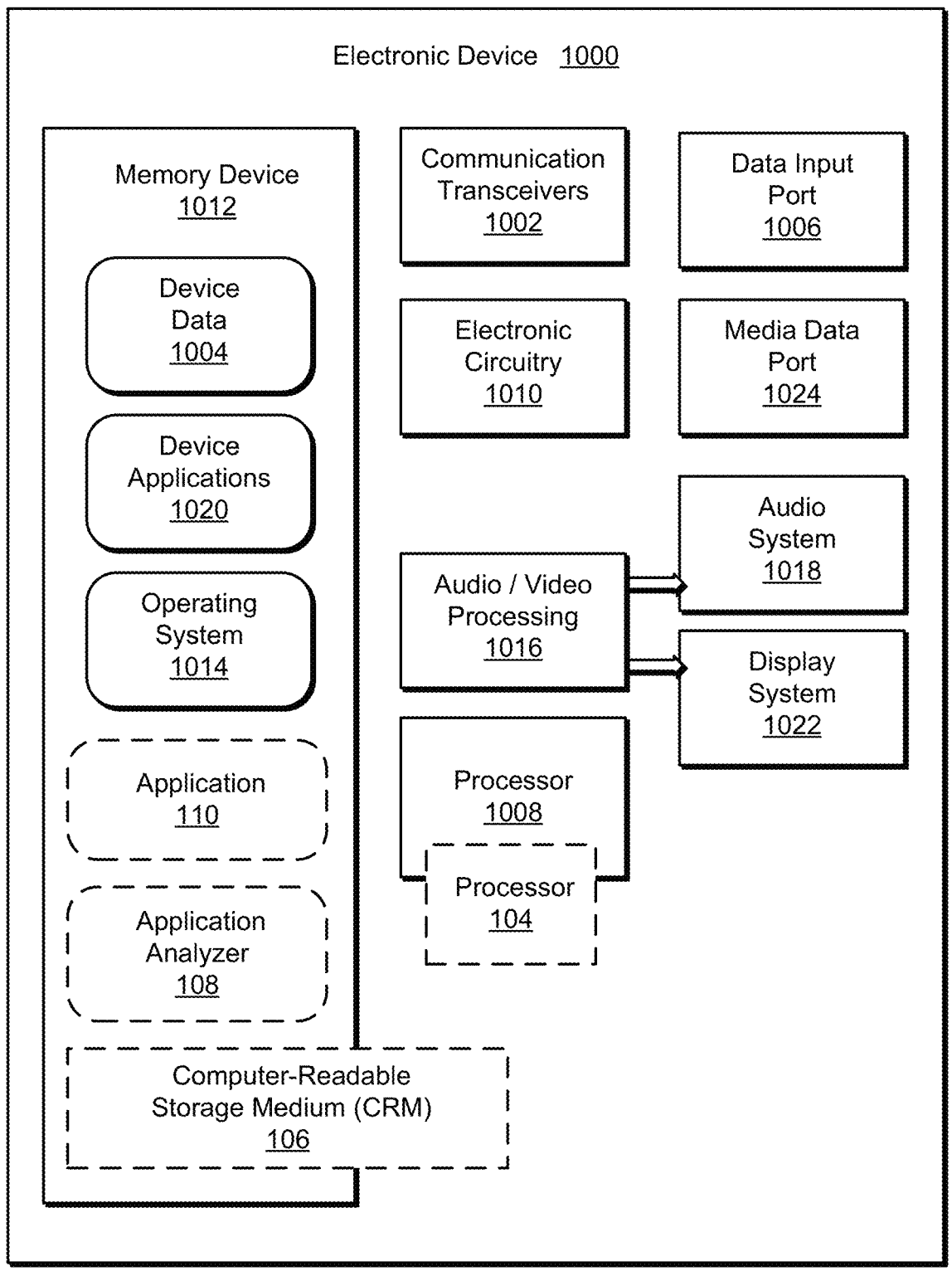
FIG. 10 illustrates various components of an example electronic device that can implement application analysis with flexible post-processing in accordance with one or more implementations.

FIG. 10 illustrates various components of an example electronic device 1000 that can implement application analysis with flexible post-processing in accordance with one or more implementations as described with reference to any of the previous FIGS. 1-8. The electronic device 1000 may be implemented as any one or combination of a fixed or mobile device; a local or a distributed device; in any form of a computer, such as a portable, end-user, or server computer; in any form of electronic device, such as communication, phone, navigation, gaming, audio, camera, messaging, media playback, consumer, business, and/or other type of electronic device, including a workstation, a virtualized machine, or distributed cloud-computing apparatus.

Electronic device 1000 includes communication transceivers 1002 that enable wired and/or wireless communication of device data 1004, such as received data, transmitted data, or other information as described above. Example communication transceivers 1002 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 1000 may also include one or more data input ports 1006 via which any type of data, media content, and/or other inputs can be received, such as user-selectable inputs, messages, applications, music, television content, recorded video content, and any other type of audio, video, and/or image data received from any content and/or data source. The data input ports 1006 may include USB ports, coaxial cable ports, and other serial or parallel connectors (including internal connectors) for flash memory, DVDs, CDs, and the like. These data input ports 1006 may be used to couple the electronic device to components, peripherals, or accessories such as keyboards, microphones, or cameras.

The electronic device 1000 of this example includes at least one processor 1008 (e.g., any one or more of application processors, microprocessors, digital-signal processors (DSPs), controllers, and the like), which can include a combined processor and memory system (e.g., implemented as part of an SoC), that processes (e.g., executes) computer-executable instructions stored on computer-readable media to control operation of the device. The processor 1008 may be implemented as an application processor, embedded controller, microcontroller, SoC, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1000 can be implemented with any one or combination of electronic circuitry, which may include software, hardware, firmware, or fixed logic circuitry that is implemented in connection with processing and control circuits, which are generally indicated at 1010 (as electronic circuitry 1010). This electronic circuitry 1010 can implement executable or hardware-based modules (not shown) through logic circuitry and/or hardware (e.g., such as an FPGA), and so forth.

Although not shown, the electronic device 1000 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1000 also includes one or more memory devices 1012 that enable data storage, examples of which include random access memory (RAM), non-volatile memory (e.g., read-only memory (ROM), flash memory, EPROM, and EEPROM), and a disk storage device. The memory device(s) 1012 provide data storage mechanisms to store the device data 1004, other types of code and/or data, and various device applications 1020 (e.g., software applications or programs). For example, an operating system 1014 can be maintained as software instructions within the memory device 1012 and executed by the processor 1008.

As shown, the electronic device 1000 also includes an audio and/or video processing system 1016 that processes audio data and/or passes through the audio and video data to an audio system 1018 and/or to a display system 1022 (e.g., a video buffer or a screen of a smart phone or camera). The audio system 1018 and/or the display system 1022 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1024. In some implementations, the audio system 1018 and/or the display system 1022 are external or separate components of the electronic device 1000. Alternatively, the display system 1022 can be an integrated component of the example electronic device 1000, such as part of an integrated touch interface.

The electronic device 1000 of FIG. 10 is an example implementation of the electronic devices 102 of FIG. 1. Thus, the processor 1008 is an example of the processor 104. Also, the memory device 1012 is an example of the computer-readable storage medium 106 (CRM), as further indicated by the illustrated application analyzer 108. The electronic device 1000 may further include an application 110 to be analyzed. Thus, the principles of application analysis with flexible post-processing as described herein can be implemented by, or in conjunction with, the electronic device 1000 of FIG. 10.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, items represented in the accompanying figures and terms discussed herein may be indicative of one or more items or terms, and thus reference may be made interchangeably to single or plural forms of the items and terms in this written description. Although implementations for application analysis with flexible post-processing have been described in language specific to certain features and/or methods, the subject of the appended claims is not necessarily limited to the specific features or methods described. Rather, the specific features and methods are disclosed as example implementations for application analysis with flexible post-processing.

What is claimed is:

1. A method performed by at least one electronic device for application analysis with flexible post-processing, the method comprising:
    loading an application to be analyzed;
    obtaining a test suite including multiple test cases, each test case designed to test at least one feature of the application;
    crawling the application from a user interaction perspective, including:
    activating user interaction elements using the multiple test cases of the test suite to cause the application to produce multiple user interface (UI) screens; and
    determining multiple application states of the application, each respective application state corresponding to a respective UI screen of the multiple UI screens produced by the application;
    generating a set of artifacts based on the multiple application states; and
    after the crawling of the application based on the multiple test cases of the test suite, processing the set of artifacts to investigate multiple types of issues pertaining to operation of the application, including:
        applying multiple post-processors to the set of artifacts, each respective post-processor configured to investigate a respective type of issue of the multiple types of issues by traversing the set of artifacts to obtain state data resulting from simulated or emulated execution of the application, the respective type of issue of the multiple types of issues corresponding to different respective problems potentially impacting operation of the application;
        extracting, by each respective post-processor of the multiple post-processors and using one or more respective filters, relevant portions of the state data, the relevant portions of the state data corresponding to the respective type of issue, the one or more respective filters being tuned to the respective type of issue;
        evaluating, by each respective post-processor and based on one or more respective rules, the relevant portions of the state data, the one or more respective rules being based on the respective type of issue; and
        producing, based on the evaluating of the relevant portions of the state data, a respective report of multiple reports by each respective post-processor of the multiple post-processors, each respective report being indicative of one or more issues with an operation of the application that correspond to the respective type of issue of the respective post-processor.

2. The method of claim 1, wherein:
    at least one post-processor of the multiple post-processors modifies the set of artifacts; and
    each respective post-processor of the other post-processors is further configured to investigate the respective type of issue of the multiple types of issues by traversing the modified set of artifacts, extracting relevant portions of the modified set of artifacts, and evaluating the relevant portions.

3. The method of claim 1, wherein each post-processor of the multiple post-processors is further configured to exclude, using the one or more respective filters, non-relevant portions of the state data, the non-relevant portions of the state data not relevant to the respective type of issue of the respective post-processor based on at least one filter.

4. The method of claim 1, wherein:
    the set of artifacts comprises a directed graph having multiple nodes, each node corresponding to a UI screen of the multiple UI screens and an application state of the multiple application states;
    traversing the set of artifacts to obtain state data resulting from simulated or emulated execution of the application comprises traversing the directed graph from node to node of the multiple nodes; and
    extracting relevant portions of the state data comprises extracting, using the one or more respective filters, the relevant portions of the state data from the multiple UI screens and the multiple application states of the traversed nodes.

5. The method of claim 1, wherein the activating the user interaction elements comprises emulating at least one of pressing a virtual button, entering text in a box, or swiping along a screen.

6. The method of claim 1, wherein the determining the multiple application states of the application comprises navigating an activated user interaction element from a first UI screen to a second UI screen of the multiple UI screens.

7. The method of claim 1, wherein the processing the set of artifacts further comprises:
    determining multiple selected issues from among multiple issues reported by the multiple post-processors;
    performing a deduplication operation that includes at least the multiple selected issues to remove duplicate issues; and
    producing a problem report based on the deduplication operation.

8. The method of claim 1, the method further comprising exposing the set of artifacts to a new post-processor corresponding to a new type of issue without updating the test suite.

9. At least one electronic device for implementing application analysis with flexible post-processing, the electronic device comprising:
one or more processors; and
one or more computer-readable storage media storing instructions that are executable by the one or more processors, the computer-readable storage media including:
an application configured to offer multiple features;
a test suite including multiple test cases, each test case designed to test at least one feature of the multiple features;
an application runner configured to execute the application using the test suite, the application runner including:
an application crawler configured to traverse the application from a user interaction perspective and to provide metadata based on the test suite, the metadata corresponding to multiple application states of the application; and
an artifact generator configured to generate a set of artifacts based on the metadata; and
multiple post-processors configured to access the set of artifacts after the application crawler provides the metadata based on the test suite, each respective post-processor configured to:
investigate a respective type of issue of multiple types of issues pertaining to operation of the application by traversing the set of artifacts to obtain state data resulting from simulated or emulated execution of the application, the respective type of issue of the multiple types of issues corresponding to different respective problems potentially impacting operation of the application;
extract, using one or more respective filters, relevant portions of the state data, the relevant portions of the state data corresponding to the respective type of issue, the one or more respective filters being tuned to the respective type of issue;
evaluate, based on one or more respective rules, the relevant portions of the state data, the one or more respective rules being based on the respective type of issue; and
produce, based on an evaluation of the relevant portions of the state data, a respective report of multiple reports, each respective report being indicative of one or more issues with an operation of the application that correspond to the respective type of issue.

10. The electronic device of claim 9, wherein the metadata is indicative of operational performance of the application across the multiple types of issues, and the set of artifacts comprises a directed graph.

11. The electronic device of claim 9, wherein:
the application crawler includes:
a user emulator configured to activate user interaction elements of multiple user interface (UI) screens based on the multiple test cases; and
a state determiner configured to determine the multiple application states from the multiple UI screens and to determine the metadata for each application state of the multiple application states; and
the set of artifacts is organized in accordance with the multiple application states.

12. The electronic device of claim 11, wherein the application runner includes a post-processor interface configured to expose the set of artifacts to a new post-processor corresponding to a new type of issue without test suite updating.

13. The electronic device of claim 11, wherein the multiple post-processors comprise:
a user interface post-processor configured to evaluate the set of artifacts to detect a user interface issue responsive to an appearance of each UI screen of the multiple UI screens based on at least one UI rule;
an accessibility post-processor configured to evaluate the set of artifacts to detect an accessibility issue based on at least one accessibility rule; and
a memory usage post-processor configured to evaluate the set of artifacts to detect a memory usage issue based on at least one memory utilization threshold.

14. The electronic device of claim 11, wherein the set of artifacts comprises:
a directed graph including multiple nodes and multiple edges respectively pointing between pairs of nodes of the multiple nodes, each node respectively corresponding to a UI screen of the multiple UI screens, and each edge respectively representative of a user interaction that effects a transition from a first UI screen to a second UI screen of the multiple UI screens.

15. The electronic device of claim 9, wherein each post-processor of the multiple post-processors is further configured to exclude, using the one or more respective filters, non-relevant portions of the state data, the non-relevant portions of the state data not relevant to the respective type of issue of the respective post-processor based on at least one filter.

16. The electronic device of claim 9, wherein a post-processor of the multiple post-processors includes:
a selection module configured to determine multiple selected issues from at least among the one or more issues included in the multiple reports based on at least one of a cap threshold or a ranking criterion;
a deduplication module configured to remove duplicate issues from the multiple selected issues in the multiple reports to produce deduplication results; and
a report production module configured to produce a problem report based on the deduplication results and the multiple reports.

17. At least one electronic device for implementing application analysis with flexible post-processing, the electronic device including one or more computer-readable storage media storing processor-executable instructions that, responsive to execution by one or more processors, cause the electronic device to perform operations comprising:
running an application to be analyzed;
emulating, based on a test suite, activation of user interaction elements to cause the application to produce multiple user interface (UI) screens;
determining multiple application states of the application, each respective application state corresponding to a respective UI screen of the multiple UI screens produced by the application;
generating a set of artifacts based on the multiple application states, the set of artifacts including a UI screen of the multiple UI screens for each application state of the multiple application states; and after the determining of the multiple application states corresponding to the multiple UI screens that are produced based on the test suite,
processing the set of artifacts using a first post-processor to investigate a first type of issue pertaining to a first problem potentially impacting operation of the application, the investigation of the first type of issue including:
traversing the set of artifacts to obtain first state data resulting from simulated or emulated execution of the application;
extracting, using one or more first filters, first relevant portions of the first state data, the first relevant portions of the first state data corresponding to the first type of issue, the one or more first filters being tuned to the first type of issue; and
evaluating, based on one or more first rules, the relevant portions of the first state data, the one or more first rules being based on the first type of issue; and
processing the set of artifacts using a second post-processor to investigate a second type of issue pertaining to a second problem potentially impacting operation of the application, the investigation of the second type of issue including:
traversing the set of artifacts to obtain second state data resulting from simulated or emulated execution of the application;
extracting, using one or more second filters, first relevant portions of the second state data, the first relevant portions of the second state data corresponding to the second type of issue, the one or more second filters being tuned to the second type of issue; and
evaluating, based on one or more second rules, the relevant portions of the second state data, the one or more second rules being based on the second type of issue.

18. The electronic device of claim 17, wherein:
the processor-executable instructions, responsive to the execution by the one or more processors, cause the electronic device to perform operations further comprising:
producing, based on the processing of the set of artifacts using the first post-processor, a first report corresponding to the first type of issue; and
producing, based on the processing of the set of artifacts using the second post-processor, a second report corresponding to the second type of issue;
the first type of issue comprises an issue selected from a group comprising an accessibility issue, a UI issue, a memory usage issue, a string compression issue, a stability issue, or a network usage issue; and
the second type of issue comprises a different issue selected from the group.

19. The electronic device of claim 17, wherein:
the set of artifacts comprises a directed graph having multiple nodes, each node corresponding to a UI screen of the multiple UI screens and an application state of the multiple application states;
the processing of the set of artifacts using the first post-processor to investigate the first type of issue comprises:
traversing the directed graph from node to node of the multiple nodes to obtain the first state data; and
extracting the first relevant portions of the first state data from the multiple UI screens and the multiple application states of the traversed nodes based on the one or more first filters; and
the processor-executable instructions, responsive to the execution by the one or more processors, cause the electronic device to perform an operation further comprising producing, based on the processing of the set of artifacts using the first post-processor, a first report corresponding to the first type of issue and including an entry for the at least one determined violation based on the evaluated state data.

20. The electronic device of claim 17, wherein the processing of the set of artifacts using the first post-processor to investigate the first type of issue comprises:
updating one or more parameters of the first post-processor; and
processing the set of artifacts to investigate the first type of issue using the updated first post-processor.

* * * * *